Patented Sept. 10, 1935

2,014,124

UNITED STATES PATENT OFFICE 2,014,124

METHOD OF MANUFACTURING LAMINATED GLASS

Frederic L. Bishop, Fox Chapel Manor, Pittsburgh, Pa., assignor to American Window Glass Company, Pittsburgh, Pa., a corporation of Pennsylvania No Drawing. Application August 15, 1931, Serial No. 557,386

2 Claims. (Cl. 49—81)

This invention relates to laminated glass and the manufacture thereof and provides an improved product and process of manufacture.

It has heretofore been supposed, as set forth, for example, in Benedictus Patent No. 1,182,739, dated May 9, 1916, that where an adhesive is employed to cement the parts together the same must be dry in order to avoid clouding or fogging of the product. According to the Benedictus process a gelatin adhesive is applied and is dehydrated with alcohol prior to assembling the sandwich for uniting in the press.

My investigation of the subject has demonstrated that this process or, in fact, any process where the gelatin or other adhesive is dried before assembling, produces an inferior product. It is subject to "let-goes", which is the term employed to describe the separation over part of the area of the sandwich of the glass from the celluloid or other non-brittle material employed. Despite care in manufacture cloudiness and fogging are sometimes encountered and there is also present a defect known as "star dust". No matter how carefully the component parts of the sandwich are cleaned there frequently appears in the final product a dust-like haze which is obviously present in the plane of union of the glass and the non-brittle material. Proponents of the dry process have urged that the adhesive should be dry to the sight and to the touch in order to obtain desirable results but that it need not be any drier. It has been estimated that when gelatin is in the dry-to-sight dry-to-touch condition it contains up to 16 percent of moisture, this depending somewhat on atmospheric conditions, as the gelatin attains a state where it is in equilibrium with the moisture content in the surrounding air. Even in the dry-to-sight dry-to-touch condition, however, defects of let-goes and star dust are very frequently encountered, and, unfortunately, the let-goes often develop after the material has left the manufacturer and is in the hands of a dealer or has been put into use, as, for example, in an automobile.

The dry process also entails considerable care and expense in manufacture. Because the component parts are dry they do not tend to adhere to one another when assembled and therefore must be clipped together during the pressing operation. Tabs of gummed paper are employed for this purpose, but the thickness of the paper is sufficient to cause localization of pressure if an ordinary platen press is employed, which fact has necessitated the use of autoclaves wherein sandwiches are placed encased in rubber bags. In many cases double pressing has been resorted to in an effort to reduce the number of let-goes, but the extra operation involved increases the expense. The dipping of the sheets in alcohol constitutes another relatively expensive operation and one which is attended by a dangerous fire hazard.

Contrary to the beliefs heretofore obtaining I have discovered that it is far better to use an adhesive which is wet at the time of lamination and to press the sandwich under such conditions as will insure that the adhesive present in the final product contains moisture in an amount well above the point of equilibrium with normal atmosphere. By so doing I am able to substantially eliminate or reduce the difficulties ordinarily encountered and the manufacturing process is greatly simplified. I have found, in fact, that excellent results are obtained by assembling under water, although I prefer to spray water on the glass sheets, then to spray the adhesive and then to spray more water over the adhesive immediately prior to assembling.

My experiments have demonstrated that under certain conditions alcohol will react with a wet gelatin film to turn it milk white, or, if the reaction is not completed, to a foggy or cloudy condition. It is an interesting fact that alcohol does not have such effect on dry gelatin. The alcohol functions to soften the celluloid, but since it cannot be used with wet gelatin without causing cloudiness, I dispense with it entirely and laminate the sandwich in the absence of any dehydrating agent.

It is my belief (although I do not limit myself to such theory) that star dust is a manifestation of nuclei of dried gelatin. As is well known, glue, which is an impure form of gelatin, has been used for many years in the so-called chipping of glass, which is done by painting the glue over the glass surface and allowing it to dry. When the glue dries it pulls off the skin of the glass, leaving a spangled appearance. While the chipping is going on the glue itself has a spangled appearance and it is my belief that the star dust present in laminated glass made by the dry process bears some analogy to this condition. When dry gelatin absorbs water it swells and I believe that a large number of the let-goes encountered in laminated glass made by the dry process are caused by the gelatin absorbing water from the atmosphere and swelling, thus forcing the component parts of the sandwich away from one another.

Let-goes generally develop around the edges of the sheet and luting of the edges has frequently been resorted to in an effort to stop them. However, such efforts have not been entirely successful, for despite luting or sealing of the edges let-goes still occur. While it is obviously impossible for moisture initially trapped in the adhesive at the center of the laminated sheet to escape, it will also be seen that if the gelatin at the edges is avid for water, and the edges are exposed to air, the gelatin will take up moisture therefrom, and, swelling, will exert local pressure, tending to cause let-goes. Even a very slight imperfection in the edge sealing will permit the moisture to enter and it is quite possible that moisture may be present in the sealing material, which, of itself, would be sufficient to cause trouble. With my process it is unnecessary to seal the edges. Furthermore, the sandwich may be welded together in an ordinary platen press because there is no need of clipping the component parts together since they stay in the relative position in which they were assembled.

So far as I am advised various adhesives may be employed. Gelatin is preferred because of its low price and ease of getting it into solution, although casein or other adhesives (preferably protein adhesives) may be used. In order to insure that the adhesive will be wet at the time of lamination I prefer to mix into the solution an inhibitor which delays drying. For example, glycerine, ethylene-glycol, or diethylene-glycol may be employed. I may, for example, use a solution of—

| | Per cent by weight |
|---|---|
| Gelatin | 2½ |
| Glycerine | 2½ |
| Water | 95 | as more specifically described and claimed in the copending application of Charles H. Shoemaker, Serial No. 508,367, filed January 12, 1931.

A preferred example of my process is as follows:—Two sheets of glass are carefully cleaned and brought to room temperature or lower so as to minimize evaporation from their surfaces. A spray gun set to discharge at the rate of 20 cubic centimeters per minute and discharging a conical spray is employed and distilled water is sprayed thereby over a surface of each sheet. I prefer to make six passes; that is to say, to go over each part of the machine six times with the spray gun. The sheets are now thoroughly wet and another spray gun, discharging at the same rate, is used to apply the adhesive. I have successfully employed a solution consisting of—

| | Per cent by weight |
|---|---|
| Gelatin | 2½ |
| Glycerine | 2 |
| Water | 95½ |

Twelve passes are made with this spray gun and then the first gun, supplying distilled water, is used to spray the water over the adhesive for six more passes. A sheet of celluloid is then laid against one of the wet surfaces and the other glass sheet is laid on top of the celluloid. There is sufficient "tackiness" in the wetted surfaces to cause the component parts of the sandwich to remain substantially in their original position, and the assembling of the sandwich immediately after the spraying insures that the gelatin will be very wet. The sandwich is placed between sheets of soft cardboard which act as cushions and placed in a press. A pressing for eleven minutes at a temperature of 235° F. and a pressure of 200 pounds per square inch has proven highly satisfactory. The time, temperature and unit pressure may be varied, but the above figures give one example of a suitable relationship between these factors. After pressing, the assembled sandwich, with its component parts now rigidly and autogenously united together, is taken from the press and allowed to cool. The laminated glass thus made is highly satisfactory from the standpoint of appearance and resistance to the severe tests which are generally accepted as standard criteria of the quality of laminated glass.

My tests show that in the final product there is moisture present greatly in excess of the "equilibrium-with-normal-atmosphere" condition.

I have described a present preferred embodiment of the invention. It will be understood, however, that this is by way of illustration only and that it may be otherwise embodied or practiced within the scope of the following claims.

I claim:

1. In the manufacture of laminated glass comprising a sandwich of glass and non-brittle material, the steps consisting in forming a film of water on one surface of each of the glass sheets, forming a film of an adhesive thereon, assembling the sandwich while the adhesive is still wet, and subjecting it to heat and pressure.

2. In the manufacture of laminated glass comprising a sandwich of glass and non-brittle material, the steps consisting in forming a film of water on one surface of each of the glass sheets, forming a film of gelatin thereon, assembling the sandwich while the gelatin is still wet, and subjecting it to heat and pressure.

FREDERIC L. BISHOP.